United States Patent
Duevel et al.

(10) Patent No.: US 8,706,767 B2
(45) Date of Patent: Apr. 22, 2014

(54) COMPUTER SYSTEMS AND METHODS FOR PERFORMING A DATABASE ACCESS TO GENERATE DATABASE TABLES BASED ON STRUCTURAL INFORMATION CORRESONDING TO DATABASE OBJECTS

(75) Inventors: Olaf Duevel, Mannheim (DE); Gunther Liebich, Walldorf (DE); Rainer Leinemann, Sandhausen (DE); Dietmar Nowotny, Dielheim (DE)

(73) Assignee: SAP AG, Walldorf (DE)

( * ) Notice: Subject to any disclaimer, the term of this patent is extended or adjusted under 35 U.S.C. 154(b) by 1742 days.

(21) Appl. No.: 11/062,553

(22) Filed: Feb. 23, 2005

(65) Prior Publication Data

US 2005/0198003 A1    Sep. 8, 2005

(30) Foreign Application Priority Data

Feb. 23, 2004 (EP) .................................... 04003988

(51) Int. Cl.
G06F 7/00 (2006.01)
G06F 17/30 (2006.01)

(52) U.S. Cl.
CPC .......... G06F 17/30731 (2013.01); G06F 17/30 (2013.01)
USPC .......................................... 707/794; 707/738

(58) Field of Classification Search
CPC .............. G06F 17/30731; G06F 17/30
USPC .................................................. 707/738, 794
See application file for complete search history.

(56) References Cited

U.S. PATENT DOCUMENTS

| | | | |
|---|---|---|---|
| 5,291,583 A | 3/1994 | Bapat | |
| 5,794,050 A | 8/1998 | Dahlgren et al. | |
| 5,960,194 A * | 9/1999 | Choy et al. | 707/102 |
| 5,974,407 A | 10/1999 | Sacks | |
| 6,237,003 B1 | 5/2001 | Lewish et al. | |
| 6,341,289 B1 * | 1/2002 | Burroughs et al. | 707/104.1 |
| 6,490,590 B1 | 12/2002 | Fink | |
| 6,523,029 B1 * | 2/2003 | Kulyukin | 707/707 |
| 6,574,631 B1 | 6/2003 | Subramanian et al. | |
| 6,618,833 B1 | 9/2003 | Hill et al. | |
| 7,689,629 B1 * | 3/2010 | Baatz et al. | 707/794 |
| 7,814,088 B2 * | 10/2010 | Simpson et al. | 707/708 |
| 2002/0133510 A1 | 9/2002 | Lau | |
| 2005/0154708 A1 * | 7/2005 | Sun | 707/3 |

FOREIGN PATENT DOCUMENTS

DE     103 18 333 A1    11/2004
WO    WO 03/030032 A2    4/2003

OTHER PUBLICATIONS

S. Agarwal et al., "Architecting Object Applications for High Performance with Relational Databases." High Performance Object/Relational Applications, Aug. 10, 1995, pp. 1-8.
H. Noser et al., "Dynamic 3D Visualization of Database-Defined Tree Structures on the WWW by Using Rewriting Systems"; Department of Information Technology of the University of Zurich, Multimedia Laboratorium, 6 pages.
EPO Search Report, dated Jan. 10, 2004 (4 pages).
German Patent Office Search Report, dated Feb. 3, 2004 (3 pages).

* cited by examiner

*Primary Examiner* — Cheyne D Ly
(74) *Attorney, Agent, or Firm* — Finnegan, Henderson, Farabow, Garrett & Dunner, LLP

(57) ABSTRACT

Systems and methods are provided for performing a database access. In one embodiment, a computer system is provided that comprises means for receiving and storing structural information, the structural information being descriptive of a number of objects, each of the objects having sub-objects, the structural information comprising a first table and a second table for each sub-object, the first and second table including descriptive information for each sub-object, means for assigning a unique identifier to each sub-object name identified by the structural information, means for storing a mapping table of sub-object names and unique identifiers, and means for requesting generation of a database table for each sub-object identified by the structural information.

20 Claims, 7 Drawing Sheets

COMPUTER SYSTEMS AND METHODS FOR PERFORMING A DATABASE ACCESS TO GENERATE DATABASE TABLES BASED ON STRUCTURAL INFORMATION CORRESONDING TO DATABASE OBJECTS

BACKGROUND

1. Technical Field

The present invention generally relates to the field of database systems and methods. More particularly, embodiments of the invention relate to systems and methods for performing a database access.

2. Background Information

Databases are used for storing of various kinds of data, such as technical data or business data. Businesses typically must store a great deal of information regarding their operations, their customers, and/or other entities with which they have developed a relationship. Database applications (e.g., online, worldwide-web based, and others) have been developed to assist businesses in tracking, organizing, and otherwise making effective use of such information.

Each business, however, is unique and may require the storage of information specific to their business. Moreover, businesses are dynamic entities, constantly evolving as their products change and the marketplace in which they operate evolves. Thus, database applications must be individually configured to conform to the unique requirements of the business that deploys the application. Conventionally, to configure such database applications according to a customer's specifications requires that additional columns be added to the relevant database tables to store the requested additional or customer-specific information or attributes.

Applications that access a relational database reference objects in the database (e.g., tables, columns, etc.) by name. This creates a close coupling between applications and the database objects. This close coupling causes complications when upgrading either the database or the application. This situation is exacerbated when multiple applications may reference the same objects and those applications may themselves be upgraded at different times at an installed site.

U.S. Pat. No. 6,574,631 shows a method for run time optimization and customization of database applications and application entities. The method includes the steps of storing the values associated with a new attribute in an attribute table. The attribute table is configured as a logical extension of a base table that is configured to store values associated with a number of base attributes. The definitions of the new attributes are stored in an attribute meta data table that is adapted to store the definition of each of the new attributes of the attribute table.

U.S. Pat. No. 6,237,003 shows a method for supporting run time object definition in a relational database management system. A mediating layer is introduced between applications and database objects. This layer mediates access to the physical database objects, such as tables, and allows applications to embed logical instead of physical names. If desired, the mediating layer can be maintained dynamically, as applications are running.

SUMMARY

Embodiments consistent with the present invention comprise computer systems comprising means for retrieving and storing structural information. The structural information may be descriptive of a number of objects. Each of the objects may have sub-objects. The structural information can have first and second tables for each of the sub-objects.

The first table assigned to a sub-object lists the technical field names of the sub-object and can include further information regarding whether a given field is a key field or a compulsory field. The second table of an sub-object can identify the sub-object as part of a tree-structure of sub-objects. More specifically, the second table may describe a hierarchical relationship between fields of the sub-object and fields of a higher level sub-object in the hierarchical tree structure. The combination of all second tables thus can provide a complete description of the tree structure.

In one embodiment, the first and second database tables assigned to one of the sub-objects can be identified by the name of the sub-object. Likewise, the fields can be identified in the first and second tables by a common naming convention of technical field names. Unique identifiers can be generated and assigned to each sub-object name contained in the structural information. The assignment of unique identifiers to sub-object names can be stored in a mapping table.

In another embodiment, a database table may be generated automatically for each sub-object. The database table assigned to a given sub-object can be identified by the unique identifier of the sub-object and may use the same naming convention regarding the technical field names as given in the structural information. It is to be noted that the unique identifier does not need to be a globally unique identifier, but uniqueness in the domain of the database is sufficient. Embodiments consistent with the present invention may be particularly advantageous to map a customer's terminology onto a technical database system. In particular, embodiments consistent with the present invention can be enabled to automatically generate database tables based on customizing information provided as structural information. This avoids a need for manually generating database tables based on customizing information.

In one application of an embodiment of the present invention, the embodiment is used for dynamic generation of database tables on the basis of structural information that uses a customer's terminology. The customer's terminology is used as a semantic network that is automatically mapped to the database tables.

In accordance with another embodiment of the invention, each object that is described by the structural information may have a root-object and a tree structure of dependent sub-objects that depend from the root-object in one or more levels of hierarchy. The tree structure can be described by the combined second tables of the sub-objects.

In accordance with a further embodiment of the invention, technical information can be provided in addition to the structural information for dynamic generation of the database tables. The technical information describes technical properties of the fields, such as field length and data type.

One advantage of embodiments consistent with the present invention is that they may enable an application program to perform an access operation on the database without requiring information regarding the database structure and database table names. An access request of the application program may comprise a root-object name and meta data.

The meta data may describe the data structure that contains data to be written to the database tables or for receiving data that is read from the database tables. Further, the meta data of the request may assign the technical field names to the fields of the data structure.

It is to be noted that the same technical field names can be used in the meta data as in the first and second tables of the structural information and the technical information in order to span a semantic network. The database table fields to be accessed for execution of the access requests can be identified by retrieving all sub-object names of sub-objects dependent from the root-object given by the root-object name of the access requests. These sub-object names can be obtained from the second tables of the structural information. By means of the sub-object names and the root-object name, the relevant unique identifiers may be retrieved from the mapping table. The unique identifiers together with the technical field names given by the meta data unequivocally can identify the database table fields for which the access request is to be performed.

In accordance with a further preferred embodiment of the invention, the computer system is coupled to an archiving tool. The archiving tool performs database access operations in order to archive data stored in the database tables.

In accordance with a further embodiment of the invention, the computer system has a transport tool. By means of the transport tool, the structure of the database can be exported to another system or computer for the purpose of testing, modifying and/or evaluating the application.

Additional objects and advantages of embodiments consistent with the invention will be set forth in part in the description which follows, and in part will be obvious from the description, or may be learned by practice of embodiments of the invention. The objects and advantages of embodiments of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles consistent with the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
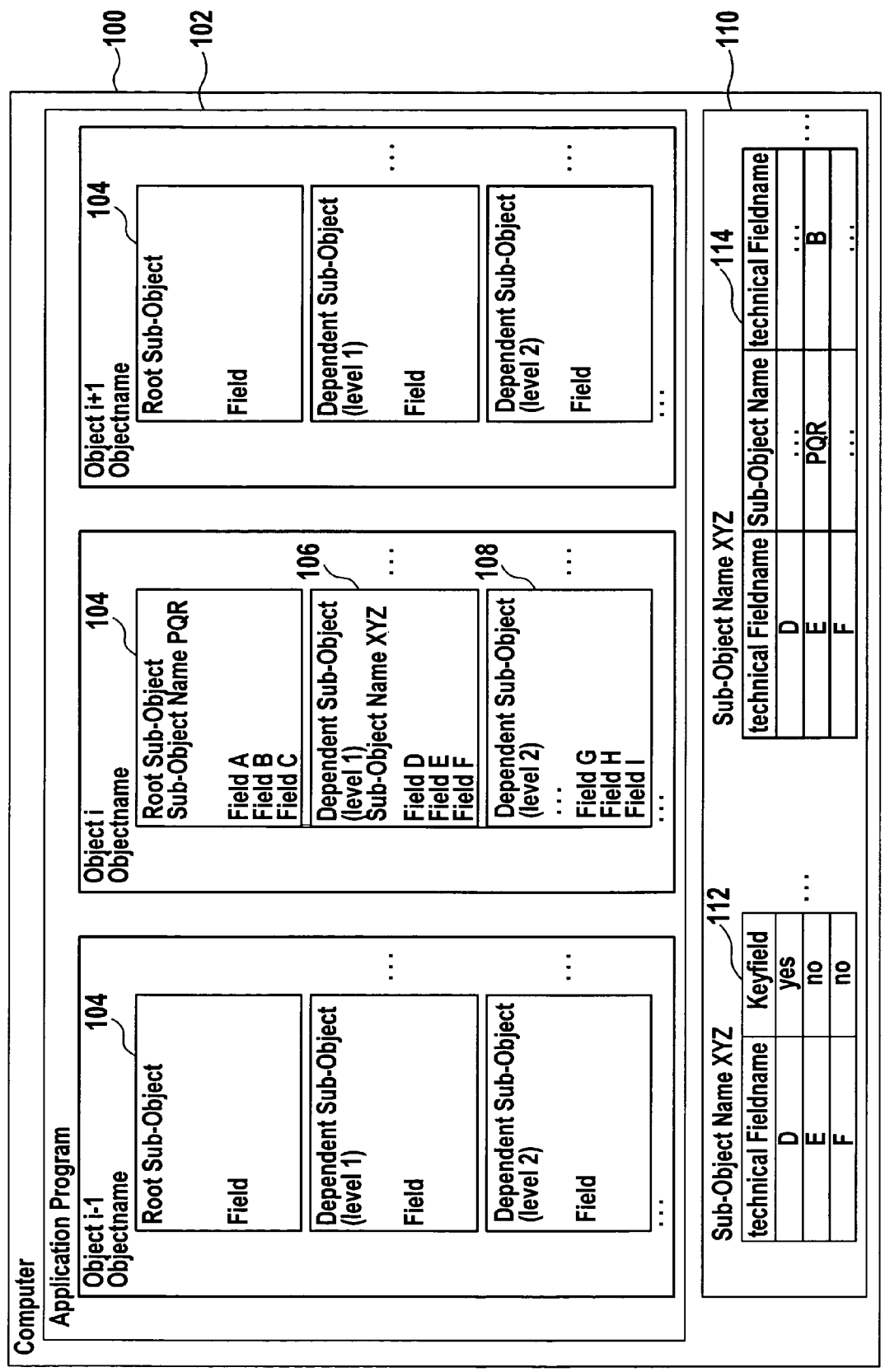
FIG. 1 is a block diagram of an exemplary computer system for running an application program.

FIG. 1 shows an exemplary computer system 100 for running an application program 102. Application program 102 is programmed for processing various objects . . . i−1, i, i+1, . . . . Each of the objects has a root-object 104 from which a number of sub-objects depend.

In one embodiment, the dependent sub-objects are arranged in a hierarchical tree structure having two levels of hierarchy of dependent sub-objects. By way of example, dependent sub-object 106 on level one of the hierarchical tree structure and dependent sub-object 108 on level two are shown in FIG. 1. It is to be noted that there can be many sub-objects on each level of hierarchy and there can be many additional levels of hierarchy in addition to those shown in FIG. 1.

Object i has a unique object name. Likewise, root sub-object 104 has a unique sub-object name 'PQR'. Root sub-object 104 of object i has fields A, B and C.

Sub-object 106 has sub-object name 'XYZ' and fields D, E and F. Sub-object 108 has another unique sub-object name and fields G, H and I. In addition to the hierarchical relationship of the dependent sub-objects 106, 108, with respect to root sub-object 104 of object I, there is an additional hierarchical relationship on a finer level of granularity regarding individual fields of the sub-objects. For example, field B of root-object 104 and field E of dependent sub-object 106 are linked by such a hierarchical relationship. Likewise, field E of sub-object 106 is linked to field H of sub-object 108 by such a hierarchical relationship.

The structure of the objects that can be processed by application program 102 is described in storage 110 of computer 100. A first table 112 is stored for each sub-object of the objects that can be processed by application program 102. By way of example, table 112 of sub-object 106 is shown in FIG. 1.

Table 112 of that sub-object 106 is identified by the name XYZ of it's assigned sub-object 106. Table 112 contains the technical field names of the fields D, E and F of its assigned sub-object 106. For each one of the technical field names table 112 indicates whether the corresponding field is a key field or not. In addition, table 112 can contain an indication for each of the fields whether the field is a compulsory field or not.

In addition, there is a second table 114 for each one of the sub-objects of the objects that can be processed by application program 102. By way of example, table 114 of sub-object 106 is shown in FIG. 1. Table 114 of sub-object 106 is identified by the sub-object name XYZ of its assigned sub-object 106.

Table 114 has an entry for the key fields of corresponded sub-object which have a relation to fields of higher level sub-object. For each field identified by its technical field name a sub-object name is given in table 114. The sub-object name indicates the higher level sub-object from which the lower level sub-object 106 depends as far as the respective field is concerned.

Further, the technical field name of the higher level sub-object to which the lower level field is related, can be indicated in table 114. In the example considered here, the higher level sub-object from which all fields of the sub-object 106 depend is the root sub-object 104. As a consequence, the root sub-object name PQR is indicated in table 114.

In addition, the hierarchical relationship on the field level of granularity is described by including the technical field name B in the entry for technical field name E. This way, the hierarchical relationship between field B of root-object 104 and field E of sub-object 106 as illustrated in object i is described in table 114. In other words, table 114 identifies the higher level sub-object name for each field of the given sub-object XYZ and the technical field name of the field with which an hierarchical relationship exists in the higher level sub-object. The combination of all tables 114 of the sub-objects of a given object provides a complete description of the hierarchical structure of the object both on an object level of granularity and the field level of granularity.

Figure 2:
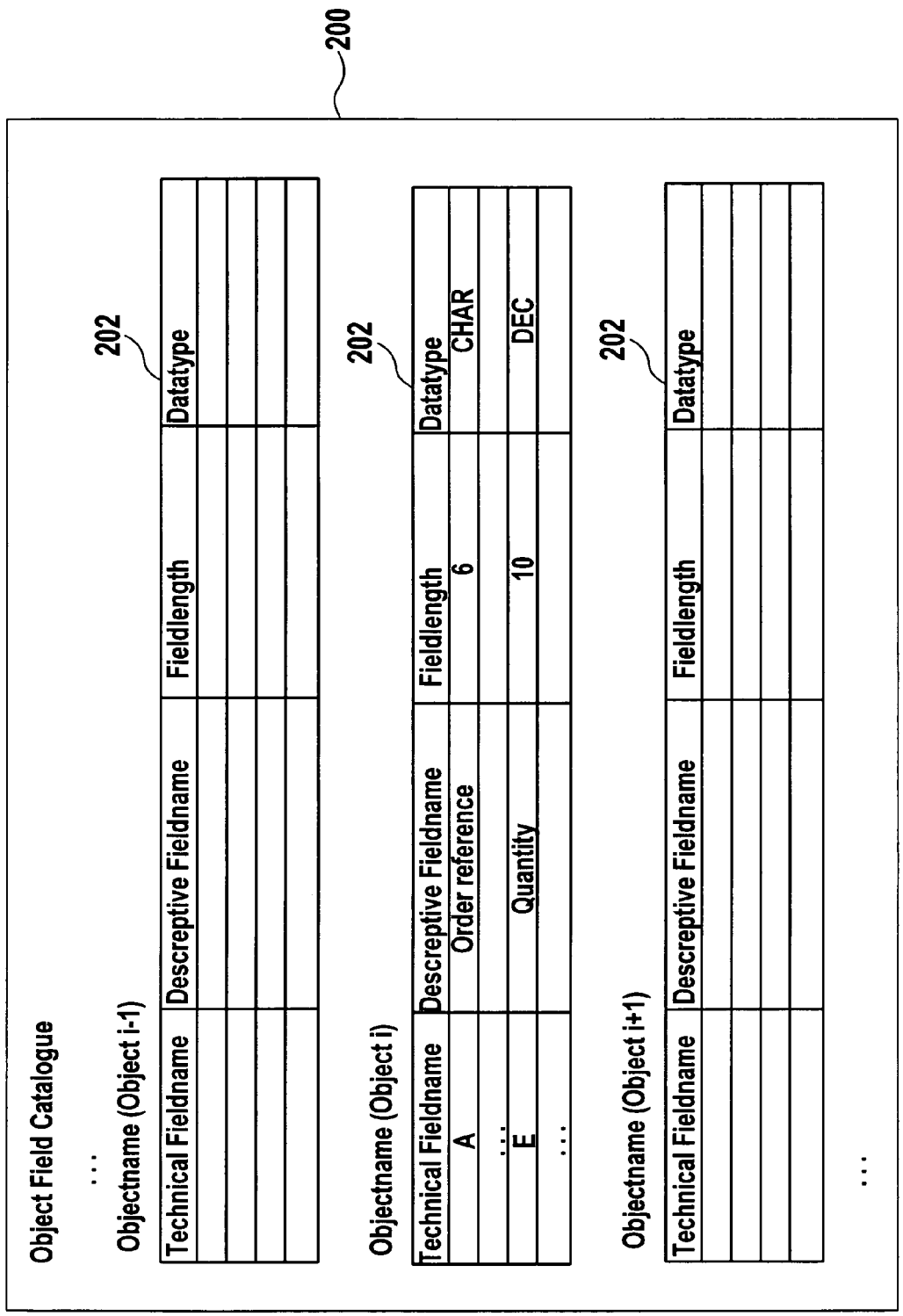
FIG. 2 is illustrative of an exemplary object field catalogue.

FIG. 2 shows an exemplary storage 200 for storing an object field catalogue. The object field catalogue has a table 202 for each of the objects i that can be processed by application program 102 (cf. FIG. 1). The table 202 provides a description of the technical properties of the fields that are identified by their technical field names. In the example considered here, the technical information includes the field length and data type of the field. In addition, a descriptive field name may be assigned to the technical field name.

The tables 202 are identified by the object names of their respective objects. For example, table 202 of object i has an entry for technical field name A. The technical properties of field A are given by the field length of 6 and data type 'character' (CHAR). In addition, the descriptive field name 'order reference' is given in table 202. Likewise, field E is given field length 10 and data type decimal' (DEC) as well as descriptive field name 'quantity'.

Figure 3:
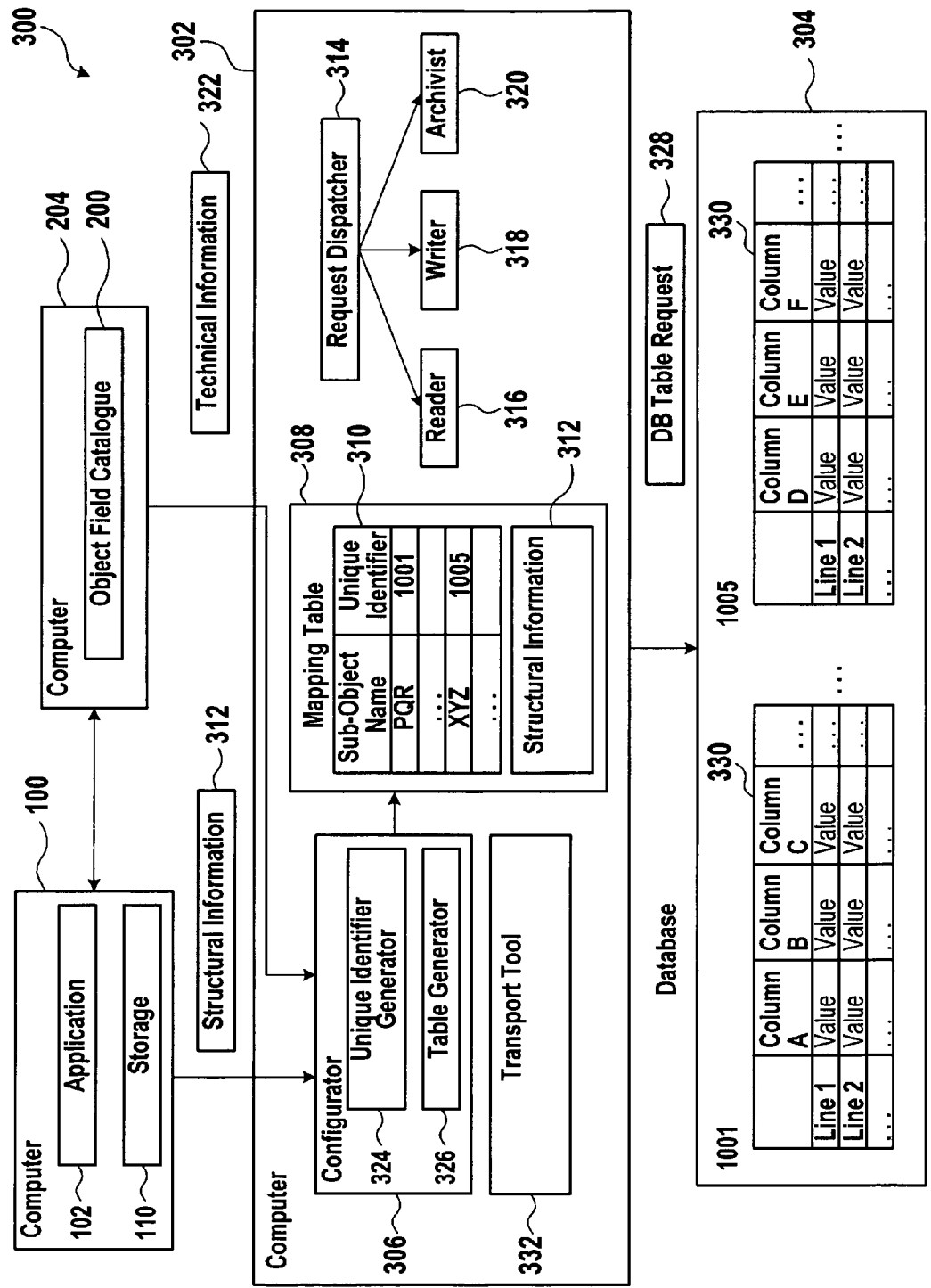
FIG. 3 is a block diagram of an exemplary computer system comprising a mapping table and a database.

FIG. 3 shows an exemplary computer system 300 comprising computer 100 (cf. FIG. 1), computer 204 having storage 200 with the object field catalogue data (cf. FIG. 2) computer 302 and database 304. Computer 302 has configurator 306, storage 308 for storing mapping table 310 and structural information 312, request dispatcher 314, reader program component 316, writer program component 318, and archivist program component 320.

In operation, structural information 312 is provided from storage 110 of computer 100 to computer 302. Structural information 312 contains the tables 112 and 114 stored in storage 110. As a result, computer 302 obtains a description of the structure of the objects that can be processed by application program 102 of computer 100.

In addition, technical information 322 is received by computer 302 from computer 204. Technical information 322 can be stored in tables 202 stored in storage 200 of computer 204.

In response to receipt of structural information 312, configuration 306 may generate a unique identifier by means of its table_identifier_generator 324 for each table 112 contained in the structural information 312. In other words, a unique identifier may be assigned to each sub-object name as represented by the tables 112. The generated unique identifier may be unequivocally inside of database system 304.

Technical information 322 regarding the field names identified by their technical field names in the tables 112 of structural information 312 is obtained from computer 204 and entered into configurator 306. On this basis, table generator 326 of configurator 306 generates requests 328 for generation of corresponding database tables by database 304.

The unique identifier that is generated and assigned to the sub-object name can be entered into mapping table 310 for later reference. In the example considered here, unique identifier 1001 is generated and assigned to sub-object name PQR (cf. sub-object 104 of FIG. 1) and unique identifier 1005 to sub-object name XYZ (cf. sub-object 106 of FIG. 1) as illustrated by the entries into mapping table 310 depicted in FIG. 3. Structural information 312 is stored in storage 308 for later reference. In addition, technical information 322 can also be stored in storage 308 for later reference.

Table generator 326 requests generation of one database table for each sub-object. The column names of the database table for a given sub-object are given by the technical field names in the table 112 contained in structural information 312 of that sub-object. The technical properties of the columns of the database table to be generated are given by the respective table 202 of technical information 322.

This way a database table 330 can be generated by database 304 for each one of the sub-objects identified by structural information 312. In the example considered here, database table 330 that has a table name given by the unique identifier of its assigned sub-object PQR has the column names A, B, C, . . . given by the same technical field names A, B, C, . . . stored in respective table 112 and column properties as specified for those column and field names by technical information 322. Likewise, database table 330 for sub-object XYZ has database table name 1005, i.e., the unique identifier of its assigned sub-object, and the column names as identified by the respective table 112 and column properties as specified by technical information 322. In one embodiment, the values in columns of database tables 330 are initially empty.

It is to be noted that the technical field names can be provided by a naming convention that is globally applicable across the entire computer system 300. In other words, the same technical field name is used for identification of a given field by application program 102, in tables 112, 114, 202 as well as in database tables 330.

However, database tables 330 can have technical table names that are different from the sub-object names of their respective assigned sub-objects. Thus, a semantic network is spanned that enables application program 102 to perform access operations on database 304 without requiring knowledge of the structure and table names of database 304. This provides a high degree of flexibility regarding customization of computer system 300.

This can be particularly advantageous as database tables 330 can be generated automatically on the basis of the customizing information as reflected by structural information 312 and technical information 322 without the requirement of human interaction. In particular, this avoids the technical task of manually defining database tables in compliance with the business oriented information.

In addition, computer 302 has transport tool 332 that can provide the structural information 312 and optionally the content of database tables 330 to another computer or system, such as for the purpose of testing, evaluating and modifying the customizing.

Figure 4:
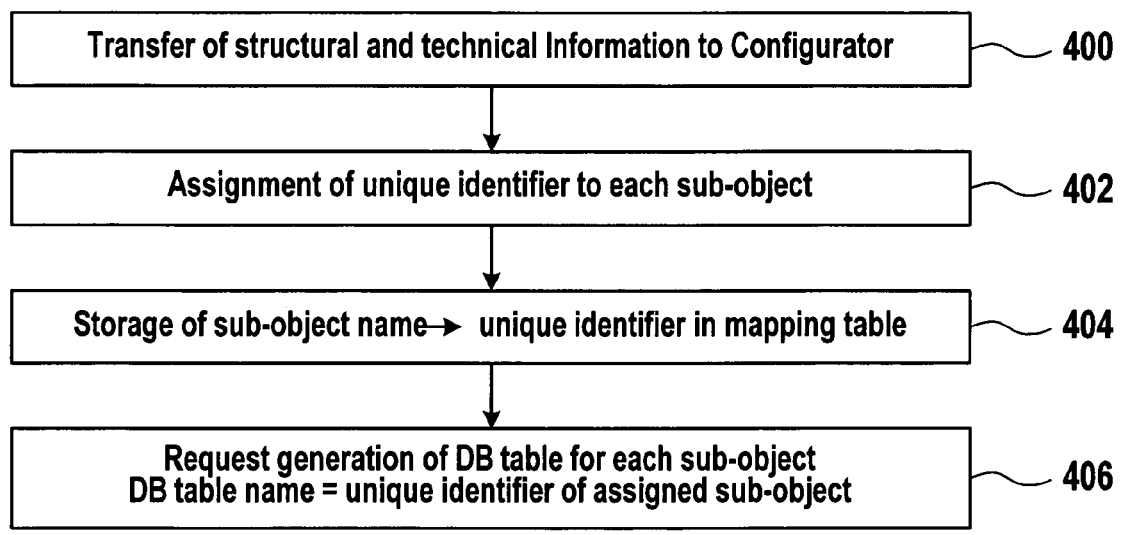
FIG. 4 is a flowchart that illustrates an exemplary method for generating a database based on structural and technical information.

An exemplary method for the generation of the database tables 330 is illustrated in the flow diagram of FIG. 4. In step 400, structural and technical information can be transferred to the configurator. In response, the configurator assigns a unique identifier to each sub-object identified in the structural information. The sub-object names may be mapped to unique identifiers which are stored in a mapping table for later reference (step 404). In step 406, generation of a database table for each of the sub-objects is requested. The database table name of the database table assigned to a given sub-object is defined by the unique identifier of that sub-object.

Figure 5:
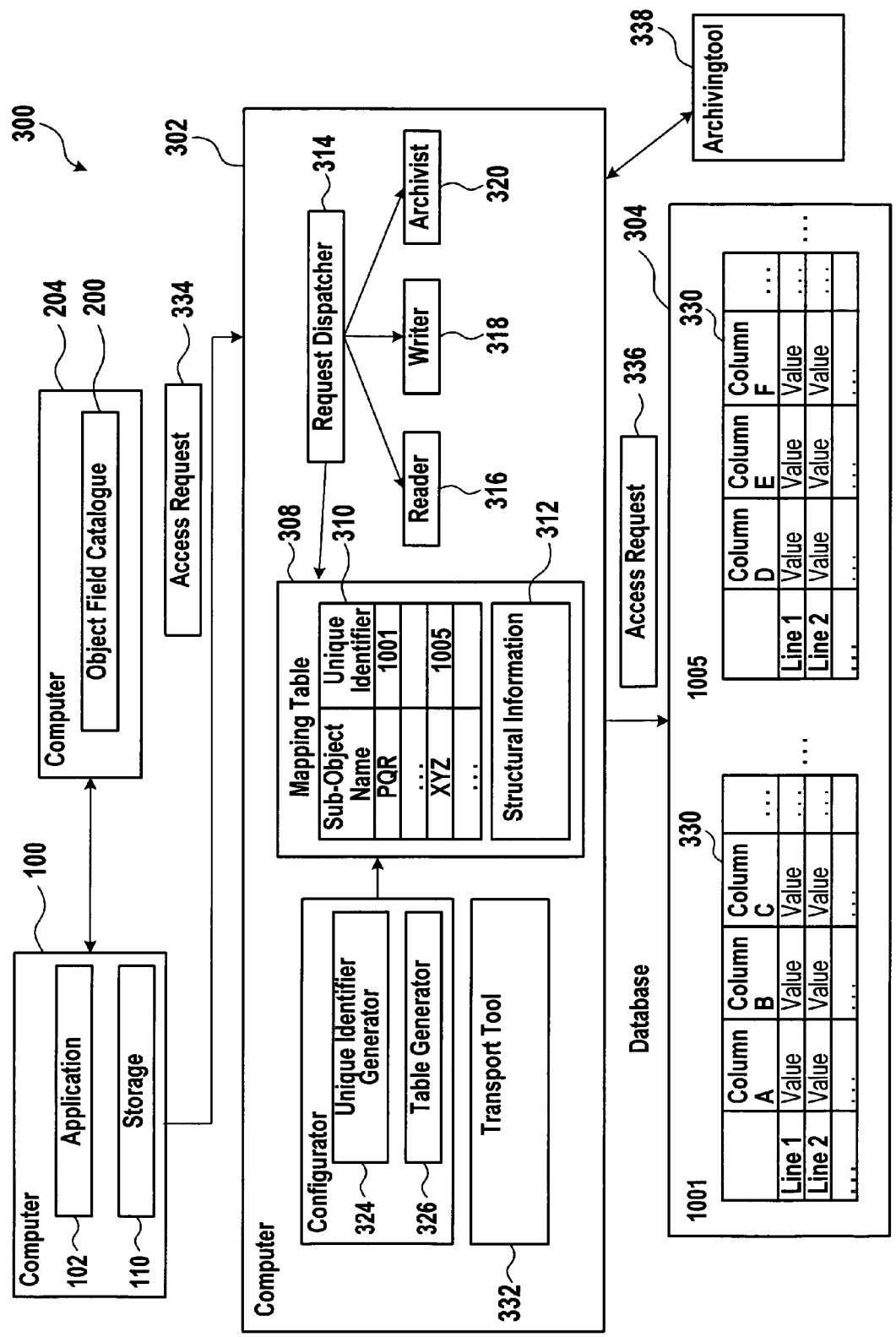
FIG. 5 illustrates an exemplary execution of an access request in the exemplary computer system of FIG. 3.

FIG. 5 illustrates an exemplary usage of computer system 300 after database tables 330 have been generated. Computer 302 receives access request 334 from application 102 running on computer 100. Access request 334 can be a read or write request. Access request 334 specifies a root sub-object by its root sub-object name and contains meta data that describes a data structure. If the access request 334 is a write request it also may contain a data structure as described by the meta data with data to be written to the database tables. The meta data indicates the technical field names for each field of the data structure described by the meta data of the access request 334. Again, the same technical field names as given by the naming convention can be utilized.

Access request 334 is received by request dispatcher 314 that forwards an access request 334 to reader program component 316 if access request 334 is a read request and to writer program component 318 if access request 334 is a write request.

In the following, it is assumed without restriction of generality that access request 334 is a write request. In this case, writer program component 318 queries the structural information 312 by means of the root sub-object name in order to retrieve all sub-objects belonging to the corresponding tree structure as described by the tables 114 of structural information 312. Thus, writer program component 318 retrieves all sub-object names of the tree structure having the root sub-object identified by access request 334.

By means of the sub-object names which are thus retrieved, the respective unique identifiers can be retrieved from mapping table 310. This way the respective database tables can be identified. As access request 334 uses the technical field name naming convention, the columns of database tables 330 on which data values need to be written may be unequivocally identified such that writer program component 318 can perform respective write access requests 336 on database 304.

In addition, structural information 312 and in particular tables 114 can be used for the purpose of checking the consistency and completeness of the data that is written to database 304.

In case of a read access operation, the procedure for identification of the database table fields is analogous. In the case of a read operation, the data that is read from the database tables 330 can be returned to application program 102 in a data structure as specified by the meta data contained in access request 334. In the case of a read operation, the access request 334 contains an additional list of technical field names and a selection condition. The list of technical field names specifies columns to be selected from database table 330. The selection condition specifies the lines to be selected from database table 330. The reader 316 transforms these information to a selection request for the database 304.

Further, in accordance with one embodiment, an archiving tool can be coupled to the computer 302.

Figure 6:
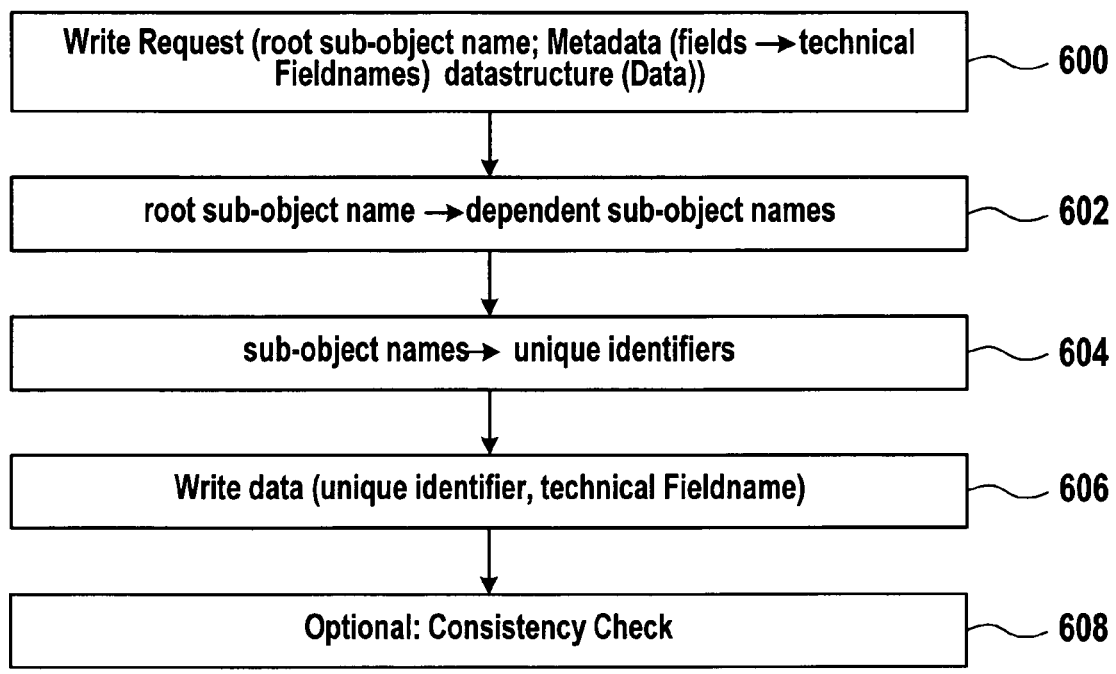
FIG. 6 is a flowchart that illustrates an exemplary method for the execution of a write request.

FIG. 6 is a flowchart that illustrates an exemplary method for the performance of a write access request. In step 600, the write access request is received. The write access request contains a root sub-object name for identification of the tree structure of sub-objects to which data is to be written. Further, the write access request contains meta data that describes the data structure containing data to be written. The meta data assigns the fields of the data structure to the technical field names of the naming convention that spans the semantic network.

In step 602, the root sub-object name is used to retrieve the dependent sub-object names from the structural information. By means of the sub-object names the respective unique identifiers are retrieved from the mapping table in step 604.

Next, the data contained in the data structure of the write access request is transformed to the structure of database tables and is written to the database tables. The respective database tables are identified by the unique identifiers retrieved in step 604. Individual database table columns are identified by the technical field names given by the meta data of the write access request (step 606).

As an option, a consistency check can be performed in step 608 in order to check the data that is written to the database for completeness. For example, it is checked whether all compulsory data fields as identified by tables 112 are filled with data or whether data is consistent with the hierarchical structure defined in table 114.

Figure 7:
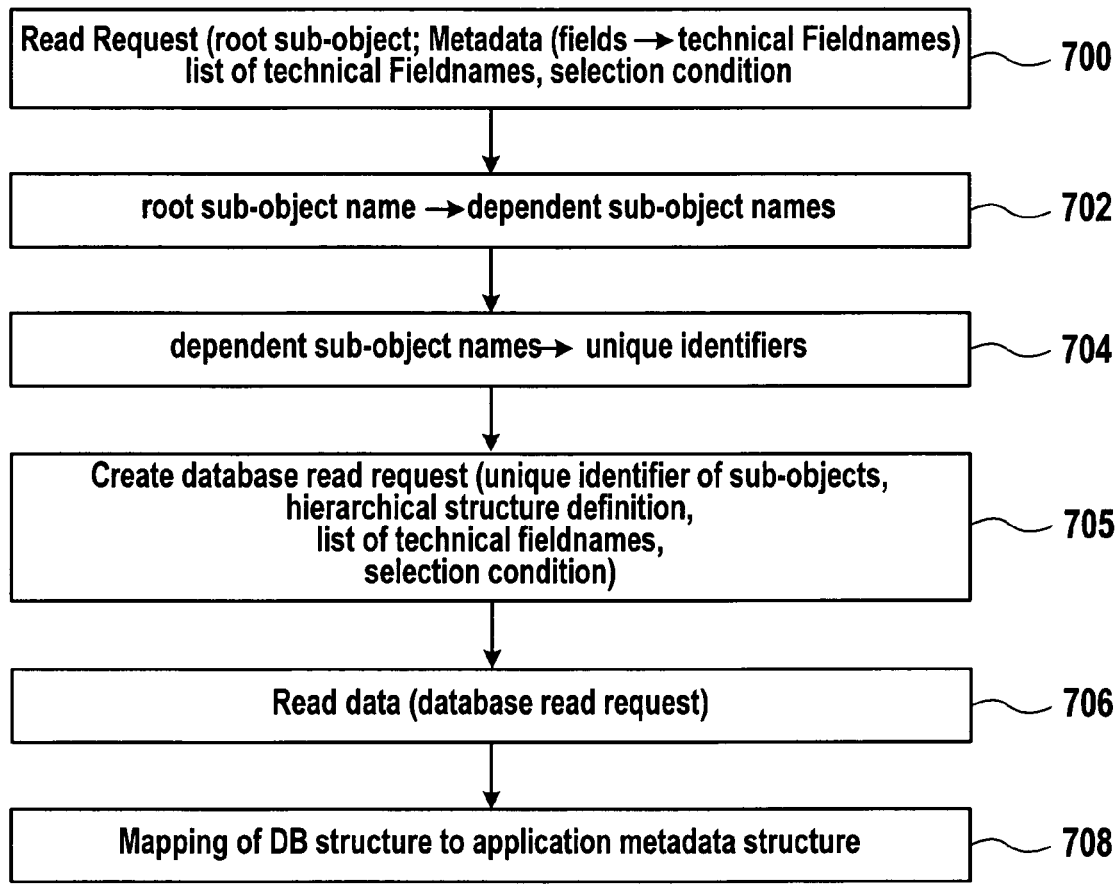
FIG. 7 is a flowchart that illustrates an exemplary method for the execution of a read request.

FIG. 7 is a flowchart that illustrates an exemplary method for the performance of a read access request. The read access request received in step 700 is structurally similar to the write access request received in step 600 in FIG. 6. In contrast to the write access request, read access request received in step 700 has no data structure with data.

Steps 702 and 704 are analogous to steps 602 and 604 of FIG. 6. Step 705 creates the database read request from table names (Step 704), hierarchical structure definition in table 114, field list (step 700) and selection condition (Step 700). In step 706, the data is read from database table in accordance with the created database read request. In step 708, the database table structure is mapped to the meta data structure as described by the meta data of the read access request. The data is returned to the calling application program in a data structure that complies with the meta data description of the read access request.

While specific embodiments of the invention have been described herein, it will be appreciated that the invention may be practiced otherwise than as described. Furthermore, the description is not intended to limit the invention. For example, the order of steps to be performed to implement methods consistent with the present invention is not limited to the order described herein or prescribed in the claims.

Other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

LIST OF REFERENCE NUMERALS

100 Computer
102 Application Program
104 Root Sub-Object
106 Sub-Object
108 Sub-Object
110 Storage
112 Table
114 Table
200 Storage
202 Table
300 Computer System
204 Computer
302 Computer
304 Database
306 Configurator
308 Storage
310 Mapping Table
312 Structural Information
314 Request Dispatcher
316 Reader Program Component
318 Writer
320 Archivist
322 Technical Information
324 Table identifier Generator
326 Table Generator
328 DB Table Request
330 Database Table
332 Transport Tool
336 Access Request
338 archiving tool

What is claimed is:

1. A computer system, comprising:
a memory device storing instructions; and
a processor executing the instructions for:
receiving and storing structural information, the structural information being descriptive of a number of objects, each of the objects having sub-objects, the structural information comprising a first table for each sub-object, each first table being identified by a sub-object name of its assigned sub-object and comprising technical field names of fields of its assigned sub-object, and a second table for each sub-object, each second table being identified by the sub-object name of its assigned sub-object and comprising the sub-object name and the technical field name of one of the sub-objects from which its assigned sub-object depends for each of the technical field names of its assigned sub-object;
assigning a unique identifier to each sub-object name identified by the structural information;
storing a mapping table of the sub-object names and the unique identifiers;
requesting generation of a database table for each sub-object identified by the structural information, the database table of one of the sub-objects being identified by the unique identifier of the one sub-object and the database table of the one sub-object having the technical field names of the one sub-object;
generating a semantic network based on database tables generated for the sub-objects, the database tables having table names and a structure;
receiving an access request including a request to process information included in the database tables having the table names and the structure; and
performing the access request by using the semantic network to retrieve information included in the database tables, wherein the information is retrieved without using the table names and the structure to process the information.

2. The computer system of claim 1, further comprising an application program for processing of objects described by the structural information.

3. The computer system of claim 1, each object having a root-object and a tree structure of dependent sub-objects, the tree structure being described by the second tables.

4. The computer system of claim 1, further comprising executing the instructions for receiving technical information, the technical information being descriptive of technical properties of fields identified by the technical field names.

5. The computer system of claim 4, wherein the technical information is descriptive of a field length and a data type of one of the fields.

6. The computer system of claim 4, the structural information comprising key field information.

7. The computer system of claim 4, the structural information comprising compulsory field information.

8. The computer system of claim 1, wherein the access request includes a root sub-object name and meta data, the meta data being descriptive of a data structure, the meta data assigning the technical field names to fields of the data structure;
retrieving all sub-object names of sub-objects dependent from the root sub-object associated with the root sub-object name identified in the access request from the second tables;
retrieving the unique identifiers assigned to the root sub-object name and the retrieved sub-object names; and
performing the access request on columns of the database tables identified by the retrieved unique identifiers and the technical field names identified by the meta data.

9. The computer system of claim 4, further comprising an archiving tool for archiving data stored in the database tables.

10. The computer system of claim 4, further comprising a transport tool component.

11. A computer program product, tangibly embodied in a non-transitory machine-readable storage medium, which when executed on a processor causes the processor to perform a method, the method comprising:
receiving and storing structural information, the structural information being descriptive of a number of objects, each of the objects having sub-objects, the structural information comprising a first table for each sub-object, each first table being identified by a sub-object name of its assigned sub-object and comprising technical field names of fields of its assigned sub-object, and a second table for each sub-object, each second table being identified by the sub-object name of its assigned sub-object and comprising the sub-object name and the technical field name of one of the sub-objects from which its assigned sub-object depends for each of the technical field names of its assigned sub-object;
assigning a unique identifier to each sub-object name identified by their structural information;
storing a mapping table of the sub-object names and the assigned unique identifiers;
requesting generation of a database table for each sub-object identified by the structural information, the database table of one of the sub-objects being identified by the unique identifier of its sub-object and having the technical field names of its assigned sub-object;
generating a semantic network based on database tables generated for the sub-objects, the database tables having table names and a structure;
receiving an access request including a request to process information included in the database tables having the table names and the structure; and
performing the access request by using the semantic network to retrieve information included in the database tables, wherein the information is retrieved without using the table names and the structure to process the information.

12. The computer program product of claim 11, each object having a root-object and a tree structure of dependent sub-objects, the tree structure being described by the second tables.

13. The computer program product of claim 11, further comprising instructions for receiving an access request, the access request comprising a root sub-object name and meta data being descriptive of a data structure, the meta data assigning the technical field names to fields of the data structure, and further comprising instructions for:
retrieving all sub-object names of sub-objects dependent from the root sub-object associated with the root sub-object name identified in the access request from the second tables;
retrieving of the unique identifiers assigned to the root sub-object name and the retrieved sub-object names; and
performing the access request on fields of the database tables being identified by the retrieved unique identifiers and the technical field names identified by the meta data.

14. A computer-implemented method for processing an access request, comprising:
receiving and storing structural information, the structural information being descriptive of a number of objects, each of the objects having sub-objects, the structural information comprising a first table for each sub-object, each first table being identified by a sub-object name of its assigned sub-object and comprising technical field names of fields of its assigned sub-object, and a second table for each sub-object, each second table being identified by the sub-object name of its assigned sub-object and comprising the sub-object name and the technical field name of one of the sub-objects from which its assigned sub-object depends for each of the technical field names of its assigned sub-object;

assigning a unique identifier to each sub-object name identified by the structural information;

storing a mapping table of the sub-object names and the unique identifiers;

requesting generation of a database table for each sub-object identified by the structural information, the database table of one of the sub-objects being identified by the unique identifier of the one sub-object and the database table of the one sub-object having the technical field names of the one sub-object;

generating a semantic network based on database tables generated for the sub-objects, the database tables having table names and a structure;

receiving an access request including a request to process information included in the database tables having the table names and the structure; and performing the access request by using the semantic network to retrieve information included in the database tables, wherein the information is retrieved without using the table names and the structure to process the information.

15. The method of claim 14, wherein each object includes a root-object and a tree structure of dependent sub-objects, the tree structure being described by the second tables.

16. The method of claim 14, further comprising receiving technical information, the technical information being descriptive of technical properties of fields identified by the technical field names.

17. The method of claim 16, wherein the technical information is descriptive of a field length and a data type of one of the fields.

18. The method of claim 16, wherein the structural information includes key field information.

19. The method of claim 16, wherein the structural information includes compulsory field information.

20. The computer system of claim 1, wherein the table name a respective one of the database tables is different than the technical field name of the respective one of the database tables.

\* \* \* \* \*